United States Patent [19]

Ayot et al.

[11] Patent Number: 5,992,411
[45] Date of Patent: Nov. 30, 1999

[54] PROCESS FOR RESTORING THE TEMPERATURE OF PRECOOKED DISHES, TRANSPORTATION AND TEMPERATURE RESTORATION CART, AND TRAY FOR PRECOOKED DISHES

[75] Inventors: Gilles Ayot, Chamoy; Jean-Marc Goujon, Epernay; Jean-Christophe Meyer, Saint Andre les Vergers, all of France

[73] Assignee: Cidelcem Industries, Lognes, France

[21] Appl. No.: 08/568,641

[22] Filed: Dec. 7, 1995

[30] Foreign Application Priority Data

Dec. 7, 1994 [FR] France .................................. 94 14696
May 24, 1995 [FR] France .................................. 95 06184

[51] Int. Cl.⁶ .................................................. A47G 23/04
[52] U.S. Cl. ............................................ 126/246; 165/918
[58] Field of Search .................................... 165/918, 919; 126/246

[56] References Cited

U.S. PATENT DOCUMENTS

| | | | |
|---|---|---|---|
| 3,498,371 | 3/1970 | Zygiel | 165/168 X |
| 4,020,310 | 4/1977 | Souder, Jr. et al. | 165/919 X |
| 4,182,405 | 1/1980 | Hysen et al. | 164/918 X |
| 4,235,282 | 11/1980 | De Filippis | 165/918 X |
| 4,285,391 | 8/1981 | Bourner | 165/919 X |
| 4,567,877 | 2/1986 | Sepahpur | 126/246 |
| 4,781,243 | 11/1988 | Devogel et al. | 165/919 X |
| 4,881,590 | 11/1989 | Meier | 165/918 X |
| 5,003,159 | 3/1991 | Thorson . | |

FOREIGN PATENT DOCUMENTS

| | | |
|---|---|---|
| 0072336 | 2/1983 | European Pat. Off. . |
| 2420947 | 10/1979 | France . |
| 2647660 | 12/1990 | France . |

*Primary Examiner*—Leonard Leo
*Attorney, Agent, or Firm*—Young & Thompson

[57] ABSTRACT

Precooked dishes loaded in a refrigerated enclosure (4) of a transport cart (1) for their transport toward a place of consumption, are selectively restored in temperature. The refrigerated cooked dishes which must be restored in temperature are, before being loaded in a single enclosure (4), disposed with the dishes not requiring restoration of temperature, on a same tray (6) common to all the dishes constituting an individual meal. Each tray is disposed directly on a heating plate inside the single enclosure (4) of said refrigerated transport cart, and the restoration of temperature of only the first-mentioned dish or dishes is effected by heat transfer through a thermally conductive region of the common tray (6) underlying only the first-mentioned dish or dishes.

14 Claims, 3 Drawing Sheets

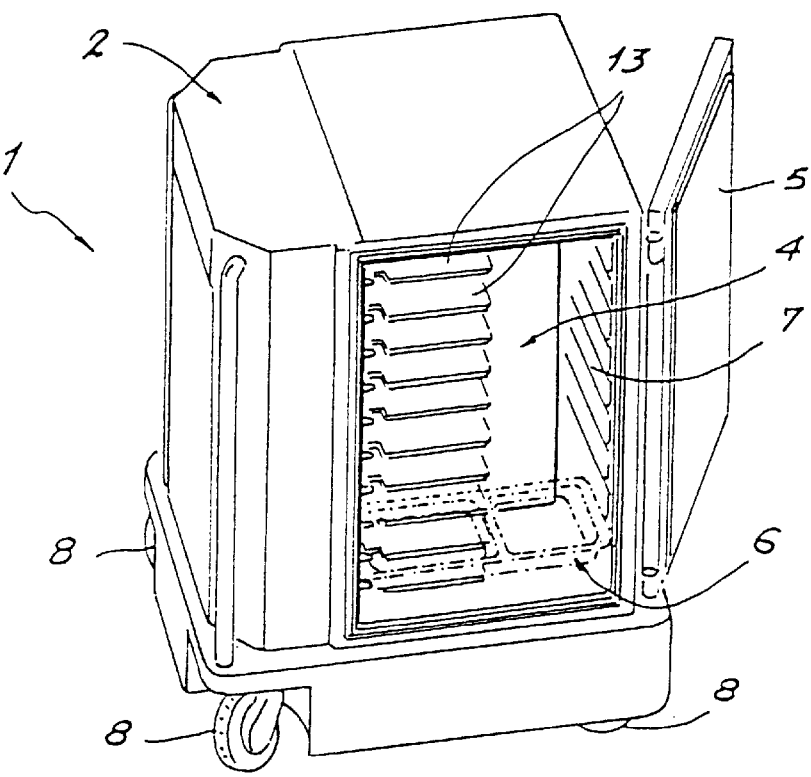
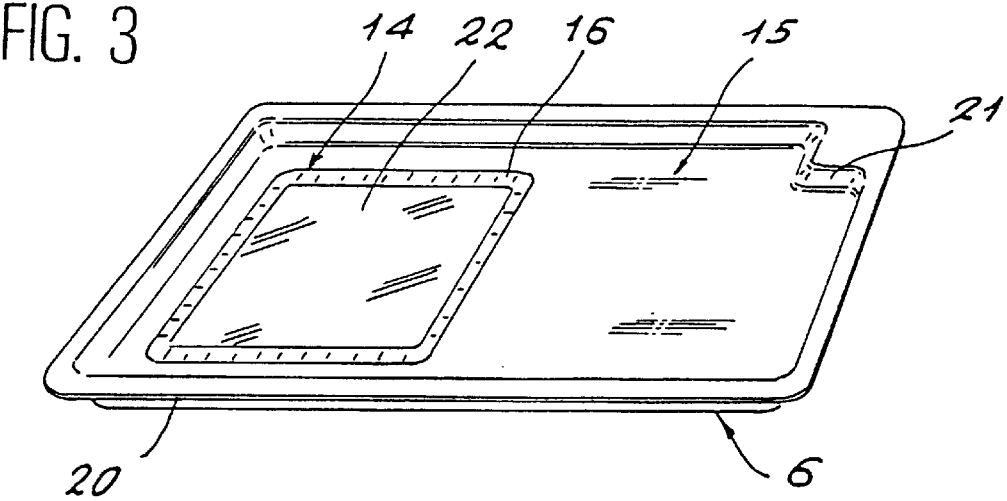

PROCESS FOR RESTORING THE TEMPERATURE OF PRECOOKED DISHES, TRANSPORTATION AND TEMPERATURE RESTORATION CART, AND TRAY FOR PRECOOKED DISHES

FIELD OF THE INVENTION

The invention relates to a process for restoring the temperature of refrigerated cooked dishes, to a transportation and temperature restoration cart for refrigerated cooked dishes, as well as to a tray for receiving refrigerated cooked dishes.

BACKGROUND OF THE INVENTION

It is known that for groups, and particularly in hospitals, the preparation of meals has particular constraints, because the simultaneous distribution of hot dishes at a desired temperature and cold dishes under good microbiological conditions is impossible to effectuate. For a number of years, the problem of feeding a large group under good conditions has been dealt with by a so-called "cold connection" technique.

In this known technique, one prepares and one cooks foodstuffs in a production unit or a central kitchen; the cooked foods are cooled by passage through a quick refrigeration unit, in which the cooked foods pass from a hot condition corresponding to a temperature comprised between 65 and 72° C., to a cold condition equal to or less than 3° C.; the cooked cooled foodstuffs are stored in a cold chamber at a temperature corresponding to the prevailing standards and less than 3° C. for a variable storage time comprised between 1 and 21 days; the cooked foodstuffs are distributed according to the individual dishes and they are placed in receptacles of the type of cups, plates or other containers; the individual dishes of cooked foodstuffs are loaded in a refrigerated transport cart; the transportation of the individual refrigerated dishes by the refrigerated transport cart takes place toward the place of consumption; certain of the cooked dishes are restored in temperature to cause them to reach a temperature comprised between 65 and 72° C.; and then the dish restored in temperature is placed on a tray with the cold dishes, and the individual consumer is served a meal thus comprising on the same tray refrigerated cooked dishes and cooked dishes restored in temperature.

In a similar manner, there is also used a technique of so-called "frozen connection", comprising a cycle of steps analogous to those described above for the so-called "cold connection" technique; the essential difference between the two techniques is that the temperature of refrigeration and storage is about 3° C. in the case of a "cold connection", whilst the temperature of freezing and storage is less than −18° C. in the case of the "frozen connection", which permits the storage of frozen foodstuffs for a storage time substantially greater, of the order of several months.

To practice the so-called "cold connection" or "frozen connection" techniques, it is known to use refrigerated transport carts.

These carts usually comprise two compartments or enclosures insulated from each other, more particularly a first enclosure in which are disposed on lateral supports trays with dishes not requiring temperature restoration, such as hors-d'oeuvres or desserts, and a second enclosure provided with a stack of electric heating plates in which are disposed the cups containing the dishes requiring temperature restoration.

Each of these two enclosures is associated with refrigeration means such as an evaporator with a fan, and cold accumulation means such as a block containing a eutectic liquid. These cold accumulation means can be common to the two enclosures.

These carts thus permit the practice of a process comprising the refrigeration, storage, transportation, and reheating of dishes which must be restored in temperature, and finally the distribution of the trays to the consumers, after having deposited the hot dish on the corresponding tray.

The drawback of this process is that the hot dish must be withdrawn from the corresponding heating plate before being, after its restoration in temperature, placed on the tray, just before giving the latter to the consumer.

This process thus requires supplemental work by service personnel who are involved in the distribution to consumers.

This handling of the hot dishes carries with it moreover risks of accidents which can give rise to burns and mistakes in the association of a hot dish with the cold dishes located on a tray. In the context of a hospital, that can have serious consequences for the patient in question.

SUMMARY OF THE INVENTION

The invention has for its object to provide a process that permits the assembly and the preparation of individual trays already in the production unit such as a central kitchen, thereby to facilitate the ultimate handling of the dishes immediately before their distribution to the consumers and which avoids the risk of accident or mistake in practicing a process of this type.

The invention also has for its object to provide a cart for practicing the process according to the invention and which moreover permits optimum usage of the space within the enclosure.

Another object of the invention is to provide a tray adapted to the cart and to the practice of the process according to the invention.

The invention has for its object a process for restoring in temperature precooked dishes loaded in a refrigerated enclosure of a transport cart for their transportation toward the consumption site, in which process certain of the refrigerated cooked dishes are restored in temperature, for their consumption, and in which certain refrigerated cooked dishes which must be restored as to temperature are, before being loaded in a single enclosure, arranged with the dishes not requiring temperature restoration, on a same tray common to all the dishes constituting an individual meal, characterized in that each tray is disposed directly on a heating plate within the single enclosure of the refrigerated transport cart, and in that the temperature restoration is effected by thermal transfer through a thermally-conductive region of the common tray.

According to other characteristics of this process:

the single enclosure is, during temperature restoration of the certain refrigerated cooked dishes, continuously refrigerated by means of refrigeration and by means of cold accumulation to maintain a suitable temperature of refrigeration of the cooked dishes that are not restored as to temperature;

the cold accumulation means are set to maintain a suitable temperature of refrigeration of the assembly of refrigerated cooked dishes when the refrigeration means and cold accumulation means are disconnected from the electric circuit;

each tray can be provided, before being disposed in the single enclosure, with an element like a bell disposed on a first portion of the tray receiving a cooked dish to be restored as to temperature, so as to delimit with said first portion of the tray a closed cavity for temperature restoration.

The invention also has for its object a refrigerated cart for the transportation of precooked dishes, of the type comprising refrigeration or cold accumulation means and means for heating or for restoring and maintaining a temperature, characterized in that the assembly of said means is contained in a single enclosure.

According to other characteristics of this cart:

it comprises at least one stack of heating plates of a total area corresponding to a first portion of the plate receiving a cooked dish to be restored as to temperature;

each heating plate is, about its periphery and on its downwardly-facing surface, provided with a thermal insulation element;

the refrigeration means comprise, plugged in series into a supply circuit, a first evaporator associated with at least one fan and a second evaporator integrated in a reservoir filled with a eutectic liquid;

the means for heating or for temperature restoration are controlled by detection means for the presence on a heating plate of a first portion of the tray receiving a cooked dish adapted to be restored in temperature.

The invention also has for its object a tray for receiving precooked dishes, characterized in that it comprises first and second portions integral with each other, the first portion constituting a good heat conductor and defining a tray region to be heated adapted to be disposed directly on a heating plate so as to ensure heat transfer from the heating plate through the region toward a dish previously disposed in this region to effect reheating, the second portion constituting a poor heat conductor insulated from the first portion, this second portion being adapted to support refrigerated cooked dishes not requiring temperature restoration.

According to other characteristics of this tray:

the first portion constituting a good heat conductor comprises a plate having excellent thermal conductivity;

the plate is at least partially embedded in a thin layer of the material of the second portion of the tray;

the first portion constituting a good heat conductor comprises particles having excellent thermal conductivity and which are embedded in the material of the second portion of the tray, this material comprising a thin layer on the upper and/or lower surfaces of the first portion of the tray;

the second portion of the tray as well as the edge regions of the tray are of a plastic material reinforced or not with glass fibers;

the first portion of the tray can receive an element having the shape of a bell so as to delimit with the latter a closed cavity for temperature restoration;

the element of bell shape has a double wall constituted by an external wall and an internal wall spaced apart so as to define between them an insulating space;

the insulating space between the external and internal walls of the bell-shaped element is filled with an insulation;

the tray is on its upper surface provided with positioning means for the bell-shaped element on the first portion of the tray;

the tray is on its lower surface provided with at least one element projecting beyond the plane in which is located the lower surface of the first portion of the tray, so as to raise at least the greater part of this surface during direct contact with a support on which the tray is disposed during its distribution to the consumer;

the second portion is thermally insulated from said first portion by air spaces corresponding to separation grooves;

the second portion is thermally insulated from said first portion by a peripheral frame of thermally insulating material.

BRIEF DESCRIPTION OF THE DRAWINGS

The invention will now be described in greater detail by means of a non-limiting example with reference to the accompanying drawings, in which:

FIG. 1 is a schematic perspective view of a cart according to the invention;

FIG. 3 is a perspective view showing an embodiment of the tray according to the invention;

DESCRIPTION OF THE PREFERRED EMBODIMENT

Figure 2:
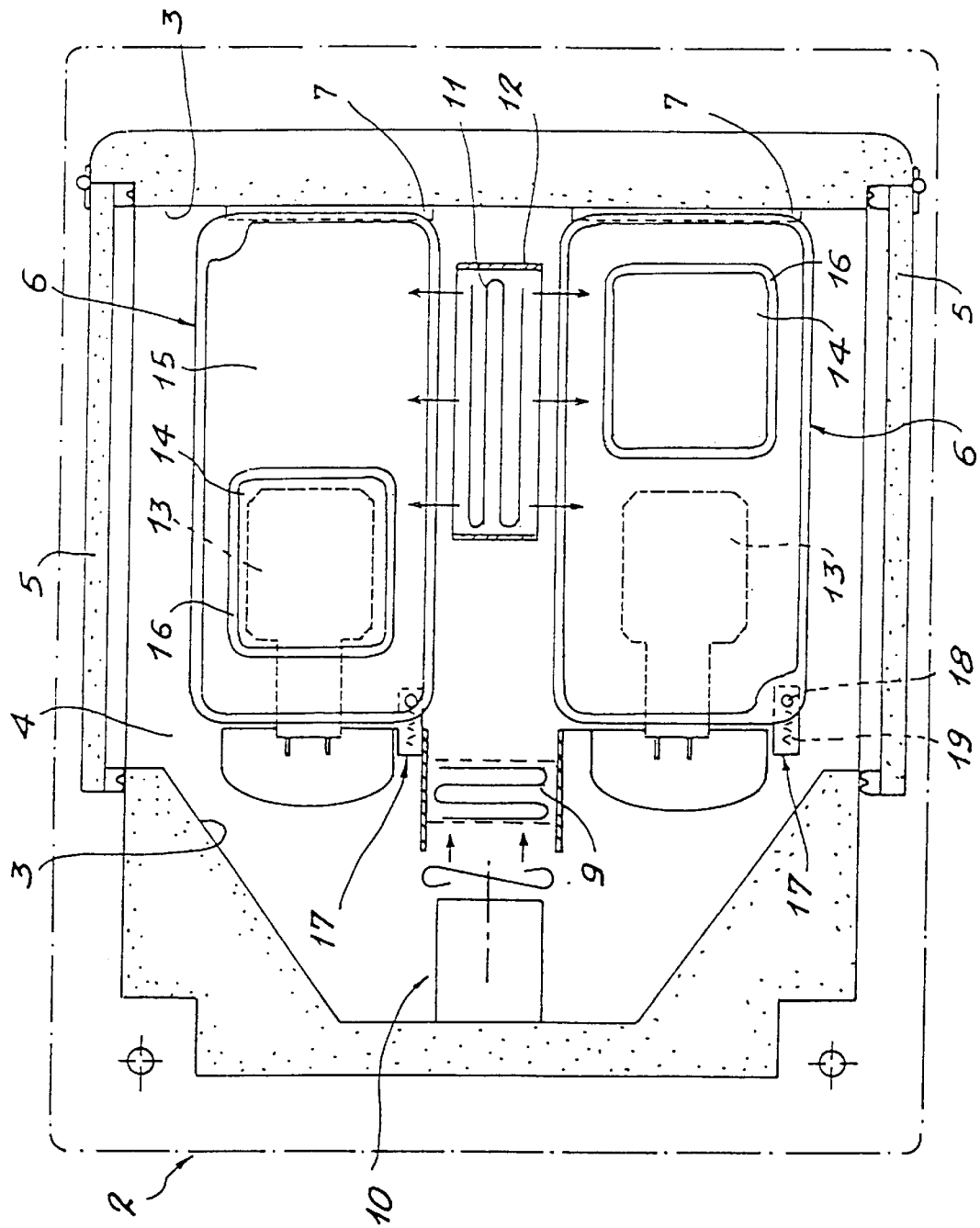
FIG. 2 is a schematic cross-sectional view from above, of a cart according to the invention, showing, among other things, the two positions of a tray according to the invention.

FIGS. 1 and 2 show an example of a cart 1 according to the invention.

These carts of the type used for refrigeration, storage, transportation and finally temperature restoration of certain dishes before distribution of the latter, comprise a housing 2 whose internal walls 3 define an enclosure 4 which can be opened and closed by a door 5 pivotally mounted on the housing 2.

Several trays 6 receiving dishes are disposed horizontally within the enclosure 4 on structures comprising lateral guidance support ribs 7.

In the example illustrated in FIG. 2, this arrangement within the enclosure 4 is duplicated and the housing 2 thus comprises two doors 5 laterally of each other so as to permit access to two rows of trays 6 disposed on opposite sides of the longitudinal access of cart 1.

All the assembly is easily displaceably mounted on wheels 8.

Refrigeration means are disposed within the enclosure 4. These means are constituted by a first evaporator 9 associated with a fan 10 and by a second evaporator 11 integrated in a reservoir 12 filled with a eutectic liquid. The two evaporators 9 and 11 can be plugged in series into an electric and/or cooling supply circuit, the electric circuit being adapted to be plugged into the network.

The first evaporator 9 constitutes refrigeration means permitting rapid temperature reduction during cooling of the enclosure 4 in a production unit or a central kitchen before receiving the dishes, but it could also be used to cool and maintain the latter at a temperature of the order of +3° C.

The second evaporator 11 also contributes to cooling of the enclosure 4, but it is essentially adapted to cool simultaneously the liquid located in the eutectic reservoir 12 which constitutes cold accumulation means adapted to be used during transportation and distribution to consumers, the cart 1 being at this time disconnected from the circuit, which will be described in greater detail later.

Each tray 6 rests on one side on a lateral guide and support rib 7 and on the opposite side on a heating plate 13.

The heating plates 13 are disposed so as to form a stack on a single side of the enclosure 4. They are adapted to be plugged into the electric network so as to heat the dishes that must be restored as to temperature and which are located in the region of the tray 14 resting directly on the corresponding plate 13, as is illustrated in the upper portion of FIG. 2.

Each tray 6 is comprised by a first tray portion 14 defining a region adapted to receive a dish to be restored as to temperature, and a second tray portion 15 adapted to support the dishes which need not be restored as to temperature. Each heating plate 13 has an area corresponding substantially to that of the first tray portion 14.

The first tray portion 14 to be heated is, so as to transmit optimally the heat to the dish to be restored in temperature, of a highly thermally conductive material so as to constitute a good heat conductor, and it can be thermally insulated from the second portion 15 of the tray supporting the dishes not to be reheated, so as not to distribute a large quantity of heat to this second portion 15 of the tray which is a poor heat conductor can for example be made of polyester, preferably reinforced with glass fibers, but also of polysulfone (PSU), phenylene polysulfide (PPS) or polyphenylene oxide (PPO). The edge regions of the tray are preferably of the same material.

An embodiment of the tray 6 according to the invention is shown in FIG. 3. The first portion of the tray 14 to be heated is disposed in a frame 16 of thermally insulating material which is resistant to heat. This first tray portion 14 is essentially constituted by a plate 22 having excellent thermal conductivity and can for example be of metal.

According to another embodiment of the plate 6 not shown in the drawings, the second poorly heat conductive portion 15 is thermally insulated from the first portion 14 by separation grooves defining air spaces which reduce to the minimum the thermal bridge between the first and second portions 14, 15 of the tray 6. In this case, it is even possible to make the tray of a single piece of metal because only the first portion 14 will be heated by the heating plate.

Figure 4:
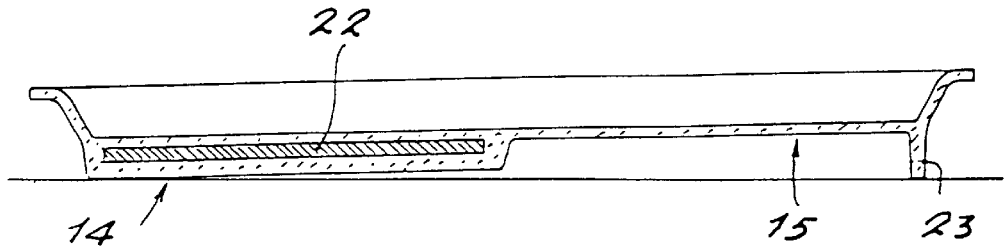
FIG. 4 is a cross-sectional view of a tray according to another embodiment of the invention.

FIG. 4 shows another embodiment of the tray according to the invention in which the first portion of the tray 14 comprises a plate 22 having excellent thermal conductivity, this plate being embedded in a thin layer of the material of which the second portion 15 of the tray is made. There is thus obtained a tray with a homogeneous surface appearance even though the thickness of the first portion 14 of the tray can be greater than that of the second.

The plate 22 can be entirely or partially embedded in the material of the second portion 15 of the tray. The lower portion of the plate can thus be free from the layer of this material so as to come into direct contact with the heating plate.

In this latter case, the plate 22 can preferably be provided with holes about its periphery or uniformly spaced over all its surface to ensure gripping by the material of the second portion 15 of the tray.

The material of the second portion 15 of the tray can be a plastic material such as: polyester loaded or not with glass fibers, polypropylene, phenylene polysulfide, polyphenylene oxide, polysulfones.

The tray can be obtained by pressure techniques or injection molding if it is a tray of plastic material.

There can also be envisaged a plain tray entirely in metal with a first portion of good heat conduction whose performance can be improved by a surface treatment such as anodic oxidation leading to a black surface thereby permitting using radiation properties. In this case, the second portion constitutes a poor heat conductor relative to the dish which is located on the second portion 15 of the tray thanks to a configuration preventing substantial contact between the metal and the dishes not to be restored as to temperature, for example by means of an embossed surface.

The metallic tray can be made for example of aluminum or stainless steel.

Figure 5:
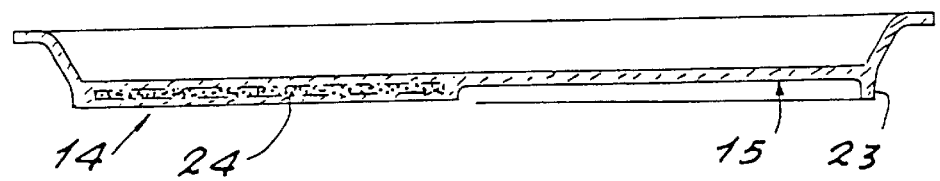
FIG. 5 is a cross-sectional view of a tray according to still another embodiment of the invention.

FIG. 5 shows still another embodiment of tray in which the first tray portion 14 constituting a good thermal conductor comprises particles 24, for example in the form of flakes, having excellent thermal conductivity and which are embedded in the material of the second portion of the tray. This material forms a thin layer on the lower and/or upper surfaces of the first portion 14 of the tray.

These particles 24 can be metallic particles which form an intermediate layer more or less well defined within the material of the tray.

Instead of the metallic particles there can be used pieces of embedded metal which can have various shapes: rounded tablets, square or rectangular strips forming a metallic trellis.

Figure 6:
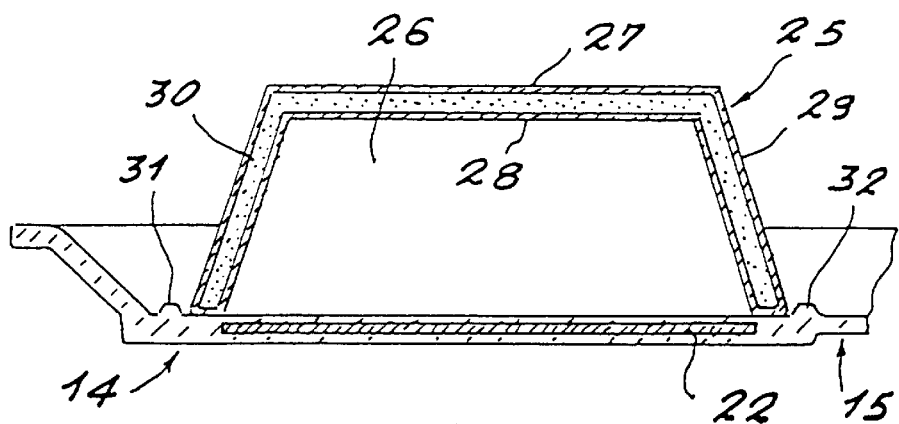
FIG. 6 is a fragmentary cross-sectional view on FIG. 4 including a bell-shaped element according to the invention.

FIG. 6 shows on a larger scale the first portion 14 of the tray shown in FIG. 4. To prevent heat which passes through the tray and which is not absorbed by the dish from radiating and so as not to heat the surroundings within the single enclosure of the cart, the tray is preferably divided with a bell-shaped element 25 which, with the upper surface of the first portion 14 of the tray, delimits a closed cavity 26 for temperature restoration.

This bell 25 is in the example shown in FIG. 6 comprised by a double wall although it naturally could also be a simple wall of insulating material or for example of a sufficiently thick plastic material.

The double wall in the illustrated example is constituted by an external wall 27 in the cold region of the chamber of the cart and an internal wall 28 in contact with the first heated portion of the tray, thereby creating a thermal equilibrium preventing condensation. The external and internal walls 27 and 28 are spaced from each other so as to form an insulating interspace 29 between the two.

So as further to improve the insulation between the cold enclosure 4 and the cavity 26 for temperature restoration, the interspace 29 is preferably filled with an insulation 30 of low density, for example constituted by a polyurethane foam.

The bell can, as can also the greater portion of the tray, be made for example of polyester, polycarbonate, polypropylene (PP), or again of ABS. The internal wall can if desired be of stainless steel.

The bell can be obtained, as to the plastic portion or portions, by blow molding, thermoforming or injection molding.

The bells are preferably so designed that when they are stacked, air can circulate freely between two adjacent bells, thereby ensuring good drying. That can be obtained by ribs disposed within each bell and which bear against the external face of the bell below, so as to create a free space between the two bells.

Thanks to this bell, there is obtained an improved moisture retention of the foods, which preserves their organoleptic properties whilst preventing drying, all while avoiding condensation within the enclosure.

This bell 25 can actually be combined with any one of the embodiments of the tray described above.

So as to facilitate positioning the bell 25 on the first portion 14 of the tray, the region of this latter preferably comprises positioning means which in the illustrated example are constituted by at least two ribs 31, 32 disposed on opposite sides of the first portion 14 of the tray. These positioning means can naturally also be constituted by grooves (not shown) which follow the contour of the edge of the bell 25.

The positioning of the bell on the tray should take place only on the first portion 14 of the tray, thanks for example to recesses associated with positioning fingers disposed on the bell and on the tray and which thus form a locating device.

The bell 25 is, to facilitate its handling, provided with a handle (not shown) formed directly in the upper surface of the bell.

Thus, the use of a bell according to the invention solves several problems of different natures associated with hygiene, the performance of temperature restoration, guarding the cold enclosure against heating, preventing condensation within the enclosure, and it also contributes to preserving the quality of the foodstuffs.

So as to avoid direct contact between at least the greater portion of the first portion 14 of the tray which is hot when distributed to a consumer, the tray is preferably provided with an element 23 projecting beyond the plane in which is located the lower surface of the first portion 14 of the tray. In the example illustrated in FIG. 4, this element 23 forming a projection is constituted by a rib extending parallel to the end edge of the tray on the side of the second portion 15 of the tray.

It is naturally possible to provide several one-point elements in the form of lugs projecting in the same manner as the rib 23 and which are two in number, disposed in regions of the corner of this same side of the tray. Another variation to avoid even the slightest inclination of the tray when it is resting on a support consists in also providing such lugs on the side of the first portion 14 of the tray.

Each heating tray 13 of the cart 1 is preferably controlled individually by means for the detection of the presence on the plate of a first portion 14 of the tray receiving a cooked dish to be restored in temperature.

These presence detection means comprise, in the illustrated example of FIG. 2, an electromechanical detector such as a spring switch 17. This switch comprises a ball 18 urged outwardly by a spring 19. It could also comprise a magnetic detection system, composed of a magnet and a flexible blade switch.

The switch closes to permit supply of electric current of the plate 13 when a shape in the form of an angled edge 20 of the tray 6 comes to bear against a ball 18 so as to urge the latter inwardly against the action of the spring 19, with the result that the ball connects to each other the blade contacts (not shown in the drawings) of the switch, which thereby close the circuit.

The switch opens and cuts off the supply current to the plate 13 when the tray 6 is withdrawn and consequently the ball 18 is no longer urged inwardly.

So as to foresee cases in which it is desired not to restore in temperature all the dishes located in the first portion of the trays, for example if all the individual meals prepared or certain of them must be served entirely cold, the angled edge 21 of the tray opposite the angled edge 20 that actuates the switch can preferably be so constructed that it is inwardly directed such that it does not come into contact with the switch ball when the plate is turned in the other direction before being introduced into the enclosure 4. As a result, the switch remains open when the first portion 14 of the tray is located on the heating plate 13.

It is moreover evident that in the embodiment described with reference to FIG. 6, by the concept of shaping the tray there will also be understood a shape disposed on the bell 25 and the detection thus is a matter in this case not only of the presence of the bell but indirectly of the presence of a dish which is to be reheated.

According to a modification, the detection means comprise a magnet disposed on the bell or on the tray, this magnet acting on a flexible blade switch located behind the wall of the enclosure and ensuring the completion of the electrical circuit when the magnet is adjacent.

The detection system can in its simplest form consist of a manual detection level by level.

So as not to disturb the ambient temperature of the enclosure 4 during temperature restoration of the dishes disposed on the first portion 14 of the tray when the latter is located on the heating plate 13, this latter is preferably on its lower and peripheral surfaces provided with a thermal insulation device downwardly and sidewise. Thanks to this arrangement, it is possible to have in the enclosure 4 as well as trays 6 with dishes to be restored in temperature, also trays with only dishes to be served cold, without preliminary restoration of temperature.

Such an arrangement is also important when the embodiment of tray is used which is provided with a bell, because the distance between the upper surface of the bell and the heating plate will be relatively limited.

This arrangement is also important when the trays comprising exclusively dishes to be served cold, are mixed with trays comprising dishes to be restored in temperature. In this case, it can happen that a dish not to be restored in temperature is located below a heating plate which thus must be well insulated about its periphery and on its lower surface.

The cart according to the invention operates in the following manner.

The cart 1 is first of all, in a production unit or central kitchen, connected to the electrical supply which is thus connected to the first and second evaporators 9, 11 which are operated to cool the enclosure 4, the first evaporator 9 having a fan and the second one, 11, serving first of all to refrigerate the liquid located in the reservoir 12 which constitutes a cold accumulation device.

Then, the enclosure 4 receives the trays 6 on which are disposed the precooked and refrigerated dishes.

Each tray 6 comprises a complete individual meal which can be comprised by a dish ultimately to be restored in temperature, as well as dishes, for example hors-d'oeuvres and dessert, which are not to be restored in temperature before being distributed to the consumers.

The tray 6 is placed in the enclosure 4 such that the first portion 14 of the tray supporting a dish to be restored in temperature will be disposed on a heating plate 13 and the edge 20 of the tray 6 already actuates the switch 17 which closes this portion of the supply circuit for the corresponding plate serving for the ultimate connection to the electrical supply for the restoration in temperature of dishes located on the first portion 14 of the corresponding tray 6.

Following the loading of all the trays 6 in the enclosure 4, the evaporators can continue to operate until the desired intermediate storage and/or transport temperature of the order of +3° C. has been achieved.

It is possible to leave the cart 1 connected to the electric supply if it is desired to store the prepared meals for a certain time. In the contrary case, the cart is unplugged from the electric supply to be transported toward the place of consumption.

During transport, all the dishes are maintained refrigerated by means of the eutectic reservoir 12.

Arriving at the place of consumption and before distributing the trays 6 to the consumers, the cart 1 is again plugged into the electric circuit which this time will be connected to the supply circuit for the heating plates when the operator wishes to restore the temperature.

The heating plates whose switches are first actuated by the edges of the tray are thus placed in operation to restore in temperature the dish located on the first portion 14 of the tray which rests on the plate. Heat is thus transferred from the plate to the dish by means of the first portion 14 of the tray which is a good thermal conductor.

The heat transferred by the first portion 14 of the tray is in the plane of the tray 6 practically limited to this first portion thanks to the fact that the latter is surrounded by a heat insulating frame 16 or by slots which form insulating spaces between the first and second portions 14, 15 of the tray. In the embodiments of the tray illustrated in FIGS. 4 and 5, the heat transfer will also be practically limited to the first portion 14 of the tray.

During this restoration in temperature of the dishes located on the first portion 14 of the tray, the other dishes which are not to be restored in temperature are maintained cold thanks to the refrigeration means 9, 10, 11 and 12. This temperature restoration procedure can be accelerated by the use of a bell 25 such as is illustrated in FIG. 6, this bell also having the other advantages mentioned above.

Following the temperature restoration of the dishes which are located on the first portion 14 of the tray, the cart 1 is unplugged from the electrical circuitry and displaced toward the place of distribution to the consumers. Given that the trays 6 rest on the plates until they are out of the enclosure 4, the dishes restored in temperature keep hot a relatively long time, whilst the other dishes are still kept cold, thanks to the eutectic reservoir 12.

There are thus obtained advantageous features of the invention, and more particularly:

heat accumulation by the plates, this heat being restored to the foodstuffs first chosen from others on the common tray to maintain their temperature when the cart is unplugged, for example during movement between office and consumer, cold accumulation by the eutectic reservoir, this cold being restored to the foodstuffs first chosen from among others on the common tray to maintain them in temperature when the cart is unplugged, for example during movements between the kitchen or the office and the consumer.

The tray according to the invention is also remarkable in that it constitutes a tray which is not dissociated with a first portion that is a good heat conductor and secured to a second portion which is a poor heat conductor, the first portion being adapted to be disposed directly on any heating plate.

Another advantage proceeding from the tray according to the invention resides in the fact that this tray can receive numerous standard containers, thereby freeing the client from being subject to the monopoly of a supplier.

There are thus obtained a process, a cart and a tray permitting the cooling, storage, transport, restoration in temperature and distribution from a single enclosure, of individually prepared trays and comprising initially both dishes to be restored in temperature and dishes which are not to be.

We claim:

1. Tray for receiving precooked dishes, comprising first and second portions integral with each other, said first portion (14) constituting a good heat conductor and defining a tray region to be heated that is constructed and arranged to be disposed directly on a heating plate (13) so as to ensure heat transfer from the heating plate through said region toward a dish previously disposed on this region to be reheated, said second portion (15) constituting a poor heat conductor and being insulated from said first portion (14), said second portion being constructed and arranged to support refrigerated cooked dishes not requiring temperature restoration, wherein said good heat conductor of said first portion comprises particles having a relatively high thermal conductivity embedded in a material having a relatively low thermal conductivity, and wherein said particles comprise metallic particles which form an intermediate layer within the relatively low thermal conductivity material.

2. Tray according to claim 1, wherein the second portion (15) of the tray as well as edge regions of the tray are of a plastic material reinforced with glass fibers.

3. Tray according to claim 1, further comprising an element in the form of a bell (25) for covering said first portion so as to delimit with the tray a closed cavity (26) for temperature restoration.

4. Tray according to claim 3, wherein the element of bell shape is double walled constituted by an external wall (27) and an internal wall (28) spaced from each other so as to define between them an insulating interspace (29).

5. Tray according to claim 4, wherein the interspace (29) between the external and internal walls (27, 28) of the element in the shape of a bell (25) is filled with an insulation (30).

6. Tray according to claim 3, wherein the tray is on its upper surface provided with positioning means (31, 32) for the bell-shaped element (25) on the first portion (14) of the tray.

7. Tray according to claim 1, wherein the tray is on its lower surface provided with at least one element (23) projecting beyond the plane in which is located the lower surface of the first portion (14) of the tray, so as to raise at least the larger part of this surface out of direct contact with a support on which the tray is disposed during its distribution to a consumer.

8. Tray according to claim 1, wherein said second portion (15) is thermally insulated from said first portion by a peripheral frame (16) of a thermally insulating material.

9. The tray according to claim 1, in combination with a refrigerated transport cart including:
   refrigeration means;
   heating means, said refrigeration means and said heating means being contained in a single enclosure; and
   at least one stack of heating plates, whose heating areas each correspond to an area of a respective said first portion.

10. The tray according to claim 9, wherein said refrigeration means include a first evaporator for being powered by an electrical supply circuit and a second evaporator integrated into a reservoir filled with a eutectic liquid for cooling said cart.

11. The tray according to claim 9, wherein said heating means are controlled by detection means for detecting a presence of said first portion on the heating means of said first portion.

12. The tray according to claim 11, wherein said detection means is an electromechanical detector including a spring switch closed by a pressure of an edge of said tray on said switch.

13. Tray according to claim 1, wherein said poor heat conductor of said second portion is said relatively low thermal conductivity material.

14. Tray according to claim 1, wherein the entirety of the tray is made of said relatively low thermal conductivity material, except said first portion.

* * * * *